(12) United States Patent
Jeon et al.

(10) Patent No.: US 12,315,970 B2
(45) Date of Patent: May 27, 2025

(54) FUEL CELL POWER GENERATION SYSTEM

(71) Applicants: Hyundai Motor Company, Seoul (KR); Kia Corporation, Seoul (KR)

(72) Inventors: Yeon Sik Jeon, Uijeongbu-si (KR); Su Ji Kim, Seoul (KR); Seo Yeon Kim, Seoul (KR); Yong Lip Kim, Seongnam-si (KR); Tae Woo Kim, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 581 days.

(21) Appl. No.: 17/862,100

(22) Filed: Jul. 11, 2022

(65) Prior Publication Data

US 2023/0064233 A1  Mar. 2, 2023

(30) Foreign Application Priority Data

Sep. 2, 2021  (KR) .......................... 10-2021-0117041

(51) Int. Cl.
*H01M 8/04* (2016.01)
*H01M 8/04007* (2016.01)
*H01M 8/04014* (2016.01)
*H01M 8/04082* (2016.01)

(52) U.S. Cl.
CPC ... *H01M 8/04067* (2013.01); *H01M 8/04014* (2013.01); *H01M 8/04201* (2013.01); *H01M 2250/20* (2013.01)

(58) Field of Classification Search
CPC ......... H01M 8/04067; H01M 8/04014; H01M 8/04201; H01M 2250/20

USPC .......................................................... 429/306
See application file for complete search history.

(56) References Cited

U.S. PATENT DOCUMENTS

| | | | | |
|---|---|---|---|---|
| 5,741,605 | A | * | 4/1998 | Gillett ................. H01M 8/2428 429/456 |
| 9,190,693 | B2 | * | 11/2015 | Sridhar ................. H01M 8/244 |
| 2016/0169071 | A1 | * | 6/2016 | Deivasigamani ......... F01N 5/02 60/39.5 |
| 2020/0398992 | A1 | * | 12/2020 | Morrison ............... B64D 27/24 |

FOREIGN PATENT DOCUMENTS

| | | | | |
|---|---|---|---|---|
| JP | 3349227 | B2 | * 11/2002 | .............. H01M 8/04 |
| JP | 2007112406 | A | * 5/2007 | .............. B60L 50/20 |

* cited by examiner

*Primary Examiner* — James M Erwin
(74) *Attorney, Agent, or Firm* — Morgan, Lewis & Bockius LLP (57) ABSTRACT

A fuel cell power generation system capable of providing both electric vehicle charging power and normal power, includes a fuel cell system, a radiator configured to cool the fuel cell system, a main hydrogen storage unit provided at one side of the fuel cell system, the main hydrogen storage unit being configured to store hydrogen to be supplied to the fuel cell system, a power boosting unit provided to overlap fuel cell system in a vertical direction, the power boosting unit being configured to boost power generated by the fuel cell system, a power distribution unit configured to distribute the power boosted by the power boosting unit, and a partition unit configured to prevent heat discharged from the radiator from being transferred to the main hydrogen storage unit, the power boosting unit, and the power distribution unit.

21 Claims, 11 Drawing Sheets

FUEL CELL POWER GENERATION SYSTEM

CROSS-REFERENCE TO RELATED APPLICATION

The present application claims priority to Korean Patent Application No. 10-2021-0117041, filed on Sep. 2, 2021, the entire contents of which is incorporated herein for all purposes by this reference.

BACKGROUND OF THE PRESENT DISCLOSURE

Field of the Present Disclosure

The present disclosure relates to a power generation system mounted in a transportation means to be movable, such as a vehicle, and more particularly to a fuel cell power generation system capable of providing both electric vehicle charging power and normal power.

Description of Related Art

With recent increasing popularization of electric vehicles, construction of charging infrastructure configured to charge the electric vehicles has been gradually expanded. For the charging infrastructure, AC slow charging and DC rapid charging are mainly performed, and rapid chargers are used as most public chargers excluding personal slow chargers.

When an electric vehicle is continuously driven or is driven a long distance, it is difficult to use the electric vehicle if a charging system is not provided at a midpoint between a departure and a destination, and it is not possible to drive the electric vehicle while the electric vehicle is being charged, whereby overall time for which the electric vehicle is used increases, which is inefficient in use of the electric vehicle.

Meanwhile, when driving of the electric vehicle is substantially impossible due to discharge thereof, an emergency charging system in which charging is performed through an emergency charging vehicle that stores electrical energy in a battery without dispatch of a rescue vehicle may be used. However, the emergency charging system is available only in an emergency situation and does not provide a normal charging service which may be repeatedly used, and stop time for charging is still required.

Therefore, there is a demand for technology capable of charging an electric vehicle without a user visiting a charging station and incurrence of charging time.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a fuel cell power generation system that substantially obviates one or more problems due to limitations and disadvantages of the related art.

Various aspects of the present disclosure are directed to providing a power generation system using a fuel cell system.

Various aspects of the present disclosure are directed to providing a fuel cell power generation system mounted in a cargo box of a transportation means, such as a vehicle, to be movable.

Various aspects of the present disclosure are directed to providing a fuel cell power generation system configured such that, when a fuel cell system is used as a stationary system, hot air from a radiator is prevented from being transferred to devices therearound.

Various aspects of the present disclosure are directed to providing a fuel cell power generation system configured for being mounted to another application device for power enlargement.

Objects of the present disclosure devised to solve the problems are not limited to the aforementioned object, and other unmentioned objects will be clearly understood by those skilled in the art based on the following detailed description of the present disclosure.

To achieve these objects and other advantages and in accordance with the purpose of the present disclosure, as embodied and broadly described herein, a fuel cell power generation system includes a fuel cell system, a radiator configured to cool the fuel cell system, a main hydrogen storage unit provided at one side of the fuel cell system, the main hydrogen storage unit being configured to store hydrogen to be supplied to the fuel cell system, a power boosting unit provided to overlap the fuel cell system in a vertical direction of fuel cell power generation system, the power boosting unit being configured to boost power generated by the fuel cell system, a power distribution unit configured to distribute the power boosted by the power boosting unit, and a partition unit configured to prevent heat discharged from the radiator from being transferred to the main hydrogen storage unit, the power boosting unit, and the power distribution unit.

In various exemplary embodiments of the present disclosure, the power boosting unit may be provided at the lower end portion of the fuel cell system.

In another exemplary embodiment of the present disclosure, the power boosting unit may be provided at the upper end portion of the fuel cell system.

In another exemplary embodiment of the present disclosure, the power boosting unit and the power distribution unit may be provided in the same plane at the upper end portion or the lower end portion of the fuel cell system.

In another exemplary embodiment of the present disclosure, the power distribution unit and the power boosting unit may be integrated and may be provided at the upper end portion or the lower end portion of the fuel cell system.

In another exemplary embodiment of the present disclosure, the fuel cell power generation system may further include an auxiliary hydrogen storage unit configured to additionally supply hydrogen to the fuel cell system.

The fuel cell system may include a power module complete (PMC).

The radiator may be provided at each of opposite side surfaces of the fuel cell system.

The power boosting unit may include at least one of a fuel cell DC-DC converter (FDC), a bidirectional low DC-DC converter (BLDC), and a battery.

The power distribution unit may include a high voltage distributor configured to distribute power generated by the fuel cell system.

The partition unit may include a first partition provided between the fuel cell system and the main hydrogen storage unit, a second partition provided between the fuel cell system and the power boosting unit, and a third partition provided between the fuel cell system and the power distribution unit.

The second partition may be spaced from the first partition and the third partition.

The fuel cell power generation system may further include a case configured to prevent introduction of foreign matter into the fuel cell power generation system and to protect the fuel cell system, the main hydrogen storage unit, the power boosting unit, and the power distribution unit from external impact.

The case may include an upper end maintenance window provided at an upper end portion of the case to maintain the fuel cell system, a side maintenance window provided at a side surface of the case to maintain the main hydrogen storage unit, a middle maintenance window provided at a middle portion of the case to maintain the power boosting unit, and a rear door configured to allow use of the converted power output device.

Each of the upper end maintenance window, the side maintenance window, and a side surface of the case may have a mesh structure configured to perform air cooling.

At least one of the upper end maintenance window, the side maintenance window, and the middle maintenance window may be removable.

The upper end maintenance window may have a mesh structure configured to discharge rainwater introduced into the case on a rainy day to outside the case and to perform an external air exhaust function.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Specific structural or functional descriptions of the embodiments of the present disclosure disclosed in the present embodiment are given only for illustrating embodiments of the present disclosure. Embodiments of the present disclosure may be realized in various forms, and should not be interpreted to be limited to the embodiments of the present disclosure disclosed in the present embodiment.

Since the embodiments of the present disclosure may be variously modified and may have various forms, specific embodiments will be shown in the drawings and will be described in detail in the present embodiment. However, the embodiments according to the concept of the present disclosure are not limited to such specific embodiments, and it should be understood that the present disclosure includes all alterations, equivalents, and substitutes that fall within the idea and technical scope of the present disclosure.

It will be understood that, although the terms "first", "second", etc. may be used herein to describe various elements, corresponding elements should not be understood to be limited by these terms, which are used only to distinguish one element from another. For example, within the scope defined by the present disclosure, a first element may be referred to as a second element, and similarly, a second element may be referred to as a first element.

It will be understood that, when a component is referred to as being "connected to" or "coupled to" another component, it may be directly connected to or coupled to the other component, or intervening components may be present. In contrast, when a component is referred to as being "directly connected to" or "directly coupled to" another component, there are no intervening components present. Other terms that describe the relationship between components, such as "between" and "directly between" or "adjacent to" and "directly adjacent to", must be interpreted in the same manner.

The terms used in the exemplary embodiment are provided only to explain specific embodiments, but are not intended to restrict the present disclosure. A singular representation may include a plural representation unless it represents a definitely different meaning from the context. It will be further understood that the terms "comprises", "has" and the like, when used in the exemplary embodiment, specify the presence of stated features, numbers, steps, operations, elements, components or combinations thereof, but do not preclude the presence or addition of one or more other features, numbers, steps, operations, elements, components, or combinations thereof.

Unless otherwise defined, all terms, including technical and scientific terms, used in the exemplary embodiment have the same meanings as those commonly understood by a person having ordinary skill in the art to which an exemplary embodiment of the present disclosure pertains. It will be further understood that terms, such as those defined in commonly used dictionaries, should be interpreted as having meanings consistent with their meanings in the context of the relevant art and the present disclosure, and are not to be interpreted in an idealized or overly formal sense unless expressly so defined herein.

Meanwhile, in the case in which a certain embodiment is differently realized, a function or operation specified in a specific block may be performed differently from the sequence specified in a flowchart. For example, two continuous blocks may be substantially simultaneously performed, or the blocks may be performed in reverse order depending on related functions or operations.

Hereinafter, a fuel cell power generation system according to an exemplary embodiment of the present disclosure will be described in detail with reference to the accompanying drawings.

Figure 1:
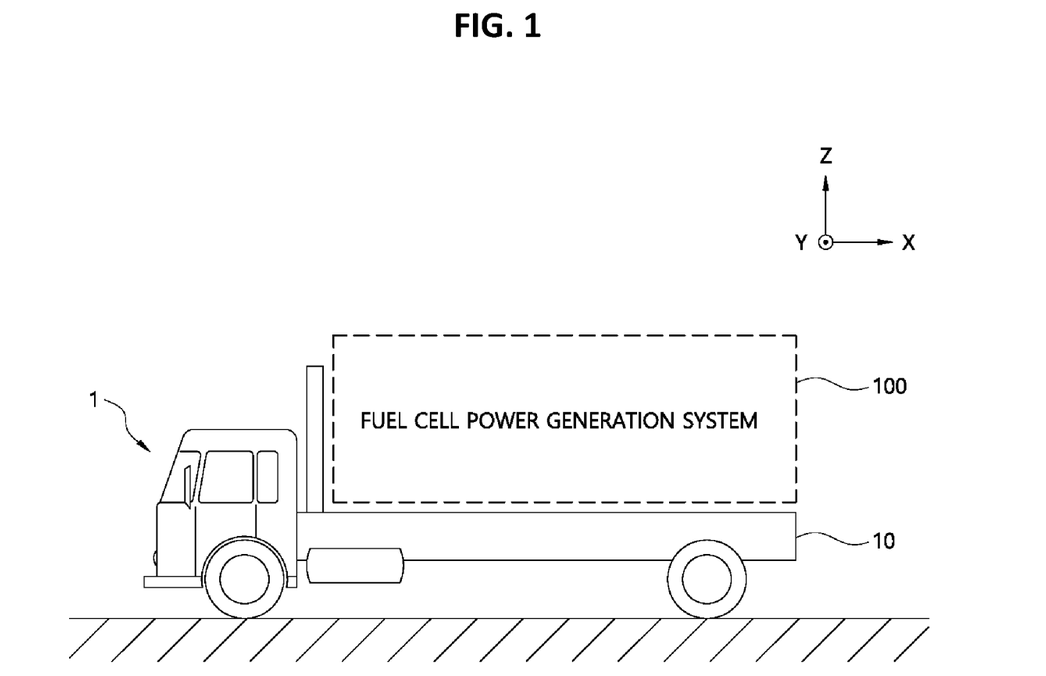
FIG. 1 is a perspective view showing an example in which a fuel cell power generation system according to an exemplary embodiment of the present disclosure is mounted in a cargo box of a vehicle.

FIG. 1 is a perspective view showing an example in which a fuel cell power generation system according to an exemplary embodiment of the present disclosure is mounted in a cargo box of a vehicle. As shown, the fuel cell power generation system 100 according to an exemplary embodiment of the present disclosure is movable in a state of being mounted in a stowage space of a transportation means, such as a cargo box 10 of a vehicle 1 as the transportation means. In the following description, a vehicle will be mentioned as an example of the transportation means. However, the present disclosure is not limited thereto as long as the transportation means has a space in which the fuel cell power generation system may be mounted. The fuel cell power generation system 100 according to an exemplary embodiment of the present disclosure may be mounted in the transportation means to move to a place at which a device that requires power is located and to supply power to the device.

Figure 2:
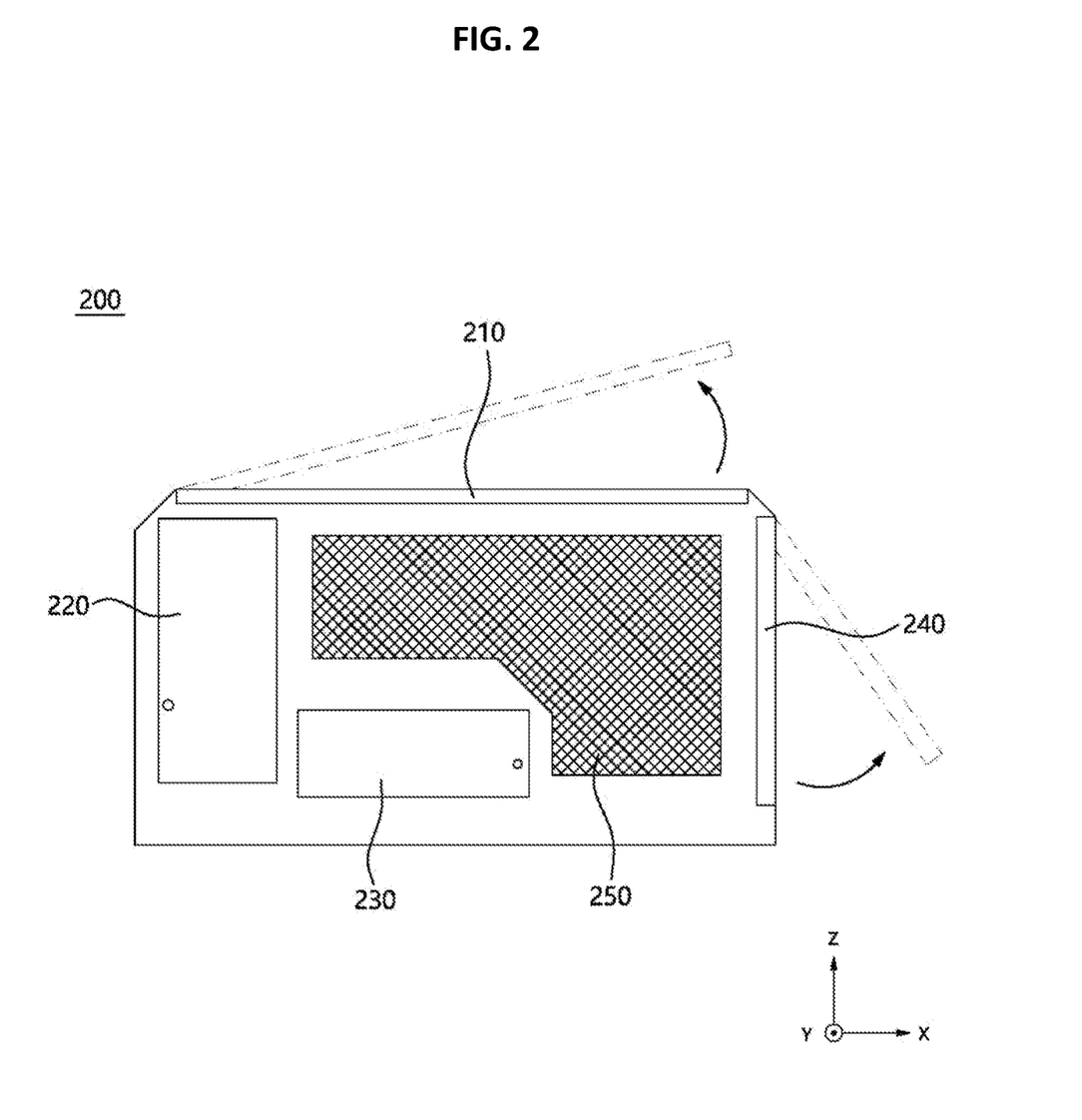
FIG. 2 is a side view showing a case of the fuel cell power generation system according to an exemplary embodiment of the present disclosure.

FIG. 2 is a side view showing a case of the fuel cell power generation system according to an exemplary embodiment of the present disclosure. As shown, the case 200 has an approximately quadrangular shape, which is merely an example, and the present disclosure is not limited thereto. For convenience of description, the transportation means will be assumed to be a vehicle, the portion of the case adjacent to a driver's seat of the vehicle will be referred to as a front portion, the portion of the case at which an output terminal configured to use power generated by a fuel cell system is provided will be referred to as a rear portion, and the portion of the case therebetween will be referred to as a middle portion. The case is provided with a plurality of maintenance windows used to replace and maintain portions of a system in the case. The plurality of maintenance windows which may be opened and closed or removed may include a maintenance window 210 provided at the upper end portion of the case, a maintenance window 220 provided at the side surface of the front portion of the case, a maintenance window 230 provided at the side surface of the middle portion of the case, and a door 240 provided at the rear portion of the case. The middle portion of the case may adopt a mesh structure 250 for inspiration of a radiator provided to cool the fuel cell system and air cooling of the fuel cell power generation system.

The upper portion of the case 200 may have a structure configured to discharge external moisture, such as snow or rainwater, to the outside via the lower portion of the case to prevent the external moisture from being introduced into the fuel cell power generation system 100 in the case. Furthermore, the upper portion of the case 200 may adopt a mesh structure configured for discharging heat generated from the fuel cell power generation system to the outside.

Figure 3:
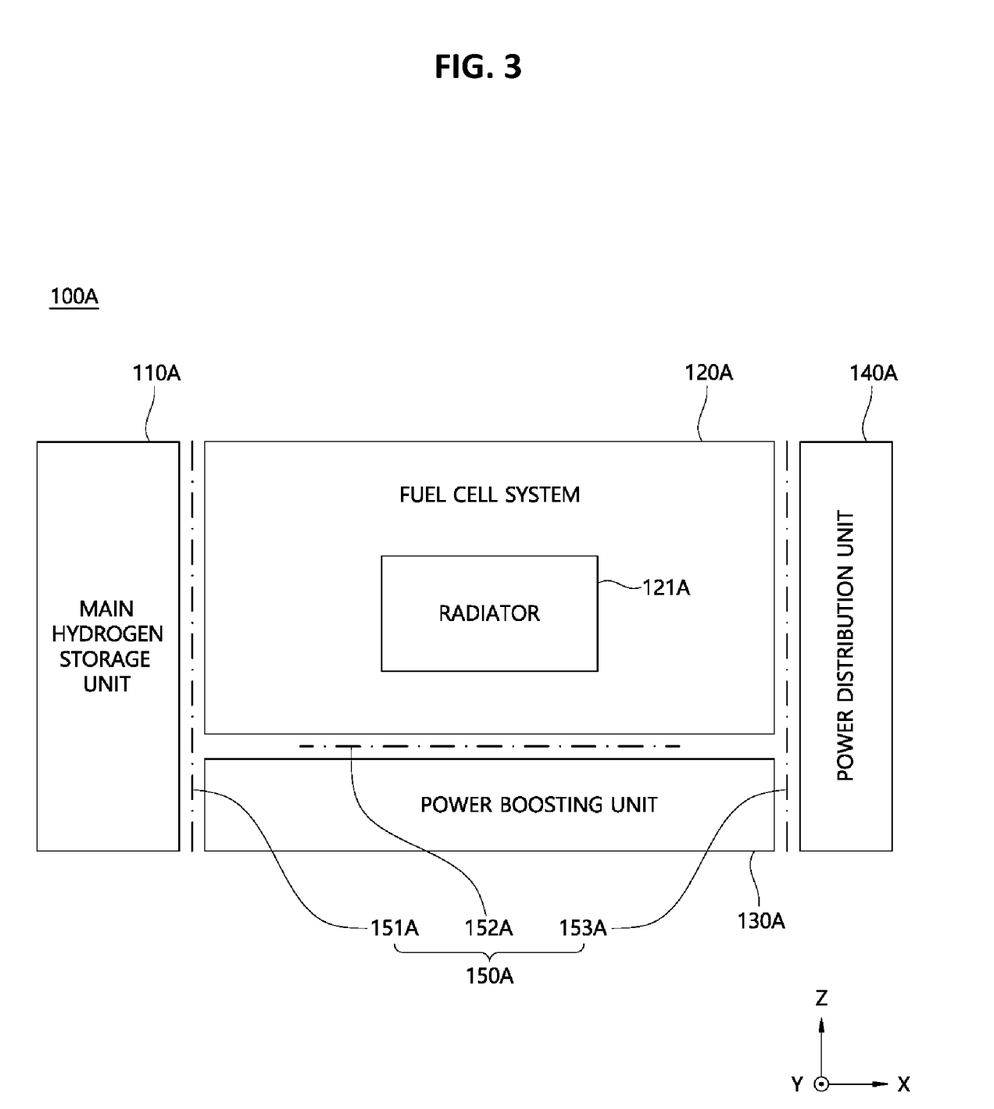
FIG. 3 is an illustrative schematic view showing the construction of a fuel cell power generation system according to various exemplary embodiments of the present disclosure.
Figure 4:
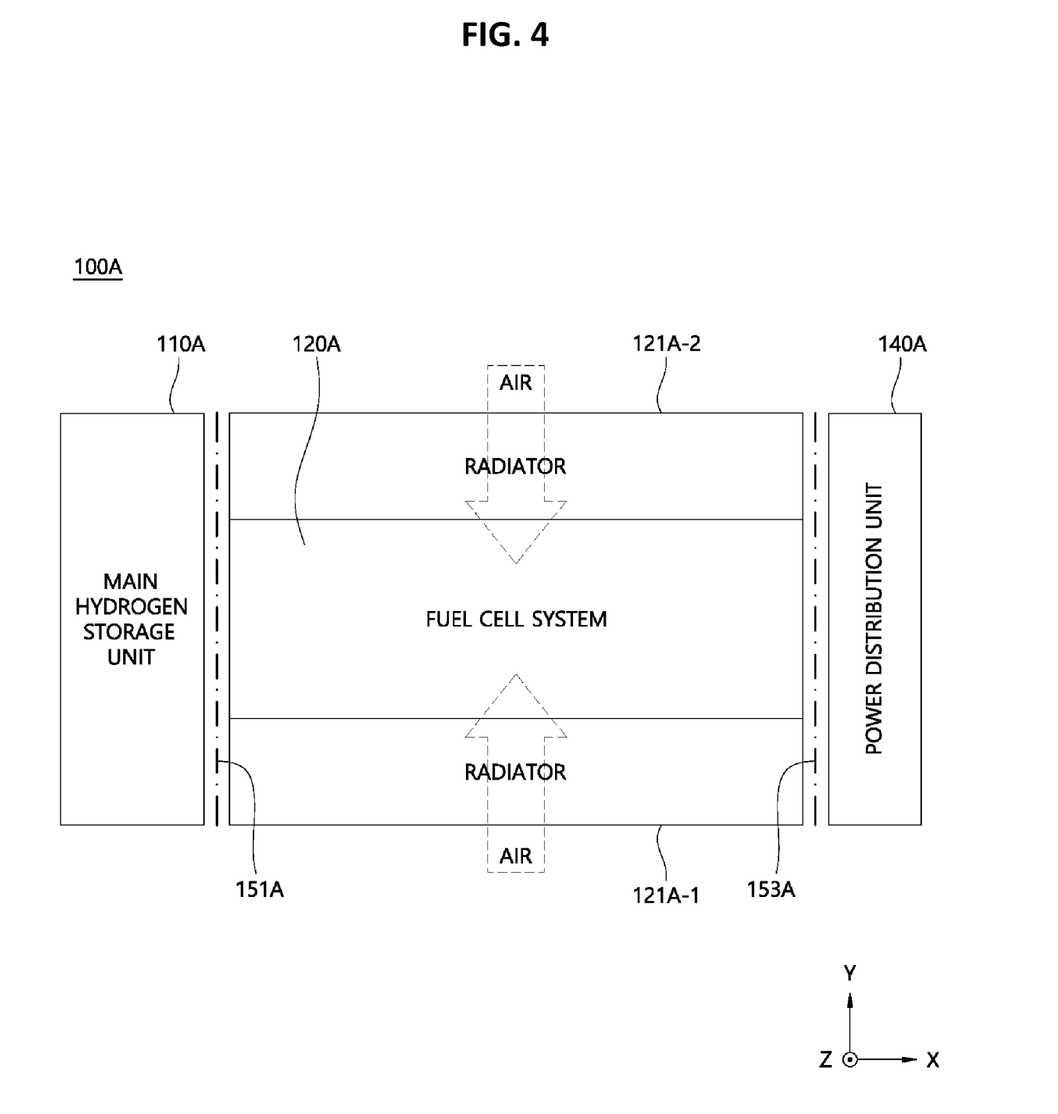
FIG. 4 is a plan view of FIG. 3.
Figure 5:
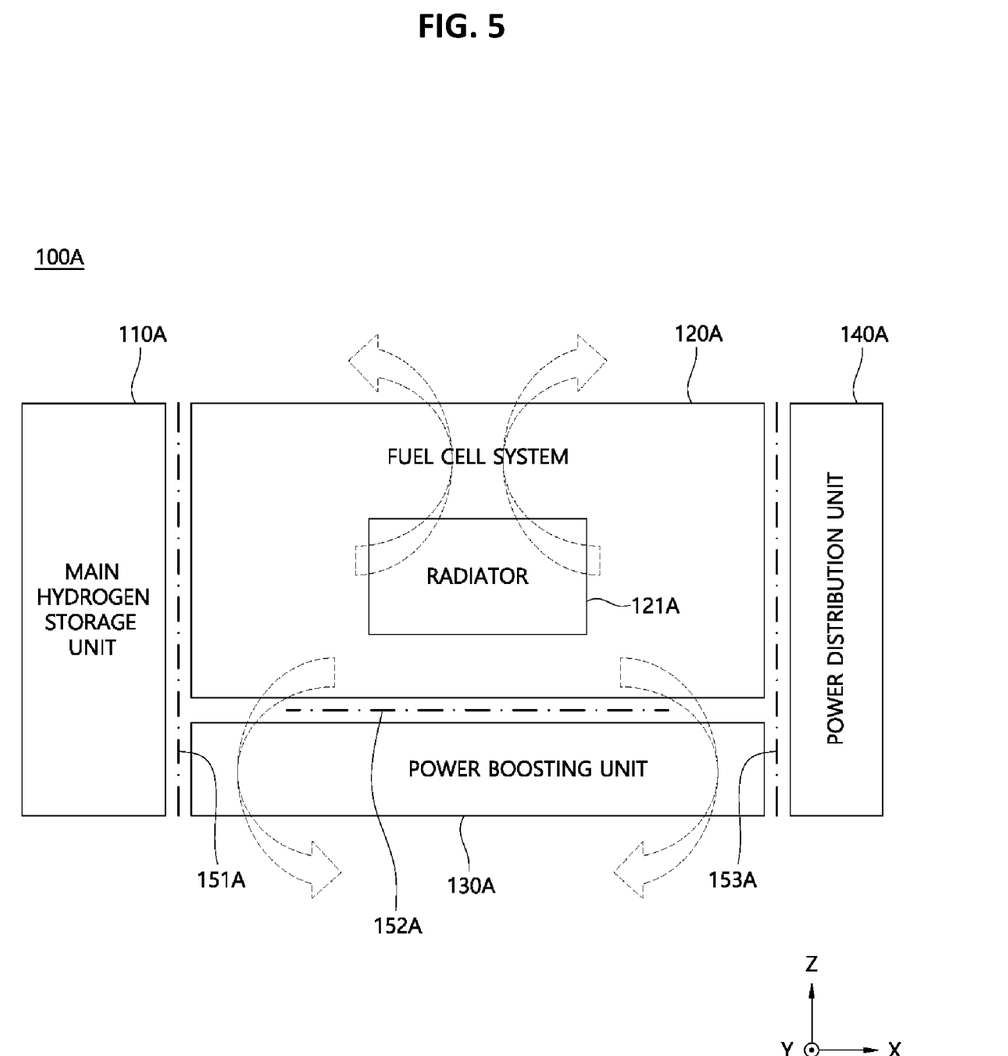
FIG. 5 is an illustrative view showing the air flow by a radiator in the construction of FIG. 3.

FIG. 3 is an illustrative schematic view showing the internal construction of a case of a fuel cell power generation system according to various exemplary embodiments of the present disclosure, FIG. 4 is a plan view of FIG. 3, and FIG. 5 is an illustrative view showing the air flow by a radiator in the construction of FIG. 3.

As shown, the fuel cell power generation system 100A according to the various exemplary embodiments includes a main hydrogen storage unit 110A, a fuel cell system 120A, radiators 121A-1 and 121A-2, a power boosting unit 130A, a power distribution unit 140A, and a partition unit 150A.

The radiators 121A-1 and 121A-2 suction external cold air and transfer the air to the fuel cell system 120A to cool the fuel cell system 120A. If directly exposed to external air heated by hot air generated from the fuel cell system 120A, therefore, the main hydrogen storage unit 110A, the power boosting unit 130A, and the power distribution unit 140A may malfunction, portions thereof may be damaged, or a dangerous situation may occur. The partition unit 150A prevents heat discharged from the radiators 121A-1 and 121A-2 from being directly transferred to the main hydrogen storage unit 110A, the power boosting unit 130A, and the power distribution unit 140A. Consequently, it is preferable for the partition unit 150A to be made of a material which is not deformed by heat. The partition unit 150A includes a first partition 151A provided between the fuel cell system 120A and the main hydrogen storage unit 110A, a second partition 152A provided between the fuel cell system 120A and the power boosting unit 130A, and a third partition 153A provided between the fuel cell system 120A and the power distribution unit 140A.

It is preferable for the main hydrogen storage unit 110A to be provided around the fuel cell system 120A to smoothly supply hydrogen to the fuel cell system 120A, and it is necessary to reduce the height of the main hydrogen storage unit 110A and to consider safety of the main hydrogen storage unit 110A at the time of vehicle collision. The main hydrogen storage unit 110A is provided in front of the fuel cell system 120A to supply hydrogen to the fuel cell system 120A. The first partition 151A between the main hydrogen storage unit 110A and the fuel cell system 120A may interrupt transfer of hot external air from the radiators 121A-1 and 121A-2 to the main hydrogen storage unit 110A.

The fuel cell system 120A may include a module type power module complete (PMC). The fuel cell system 120A may include a single module (PMC) or a plurality of modules (PMC) connected to each other in parallel.

The fuel cell system 120A includes a fuel cell stack including a plurality of stacked fuel cells, a fuel supply system configured to supply hydrogen, which is a fuel, to the fuel cell stack, an air supply system configured to supply oxygen, which is an oxidizer necessary for chemical reaction, and a heat management system configured to control temperature of the fuel cell stack.

The fuel supply system decompresses compressed hydrogen stored in the main hydrogen storage unit 110A and supplies the decompressed hydrogen to a fuel electrode (anode) of the fuel cell stack, and the air supply system supplies external air suctioned by an air blower to an air electrode (cathode) of the fuel cell stack. When hydrogen is supplied to the fuel electrode of the fuel cell stack and oxygen is supplied to the air electrode of the fuel cell stack, hydrogen ions are separated from the fuel electrode through catalyst reaction. The separated hydrogen ions are transferred to the air electrode, i.e., the cathode, through an electrolyte membrane, and the hydrogen ions separated from the fuel electrode, electrons, and oxygen electrochemically react with each other at the cathode, whereby electrical energy may be obtained. Hydrogen is electrochemically oxidized at the fuel electrode, and oxygen is electrochemically reduced at the air electrode. At the instant time, electricity and heat are generated due to movement of the electrons, and vapor or water is generated due to chemical reaction between hydrogen and oxygen. A discharge device is provided to discharge byproducts, such as vapor, water, and heat, generated in an electrical energy generation process of the fuel cell stack and unreacted hydrogen and oxygen. Gases, such as vapor, hydrogen, and oxygen, are discharged to the air through an exhaust passage.

The radiators 121A-1 and 121A-2 are provided to cool the fuel cell system 120A. The fuel cell power generation system 100 may be moved to a place that needs power using the transportation means, such as the vehicle, and may provide power in a state of being mounted in the cargo box 10. Alternatively the fuel cell power generation system may be removed from the cargo box 10 to be used as a stationary system. To cool the fuel cell system 120A, the radiators 121A-1 and 121A-2 may be provided at opposite side surfaces of the fuel cell system 120A, as shown in the plan view of FIG. 4.

The power boosting unit 130A is provided at the lower end portion of the fuel cell system 120A to boost power generated by the fuel cell system 120A. The power boosting unit 130A may include a fuel cell DC-DC converter (FDC), a bidirectional low DC-DC converter (BLDC), and a battery for initial driving of the fuel cell system. The battery for initial driving of the fuel cell system may output 12V DC. However, the present disclosure is not limited thereto.

It is necessary for the power boosting unit 130A to be provided adjacent to the fuel cell system 120A, and therefore it is preferable for the power boosting unit 130A to be provided at the lower end portion of the fuel cell system 120A. The power boosting unit 130A may be provided in the same space as the fuel cell system. If parts, such as the FDC, the BLDC, and the battery, are directly exposed to hot external air of the radiators, however, power elements in the portions may overheat due to an increase in temperature of the parts. To prevent the power boosting unit 130A from being directly exposed to hot external air of the radiators, therefore, the second partition 152A is provided between the fuel cell system 120A and the power boosting unit 130A. The second partition 152A may be provided at the lower end portion of the fuel cell system 120A to prevent the power boosting unit 130A from being directly exposed to hot external air of the radiators 121A-1 and 121A-2.

The power distribution unit 140A is provided at the rear of the fuel cell system 120A to distribute power boosted by the power boosting unit 130A. The power distribution unit 140A may include a high voltage distributor configured for distributing high power. The third partition 153A between the fuel cell system 120A and the power distribution unit 140A may interrupt transfer of hot external air from the radiators 121A-1 and 121A-2 to the power distribution unit 140A.

As shown in FIG. 5, transfer of hot air generated by the radiators 121A-1 and 121A-2 to the main hydrogen storage unit 110A is interrupted by the first partition 151A, and transfer of hot air generated by the radiators 121A-1 and 121A-2 to the power distribution unit 140A is interrupted by the third partition 153A. Hot air generated by the radiators 121A-1 and 121A-2 is discharged to the outside through the mesh structure formed in the maintenance window 210 provided at the upper end portion of the case 200. Meanwhile, the second partition 152A between the fuel cell system 120A and the power boosting unit 130A is spaced from the first partition 151A and the third partition 153A. Consequently, hot air generated by the radiators 121A-1 and 121A-2 is discharged through the space between the first partition 151A and the second partition 152A and the space between the first partition 151A and the third partition 153A. Consequently, it is possible to prevent hot air generated by the radiators 121A-1 and 121A-2 from affecting the power boosting unit 130A.

The maintenance window 210 formed at the upper end portion of the case 200 may be removed or opened to maintain the fuel cell system 120A, the maintenance window 220 provided at the side surface of the case 200 may be removed to maintain the main hydrogen storage unit 110A, and the maintenance window 230 provided at the middle portion of the case 200 may be removed to maintain the power boosting unit 130A.

Figure 6:
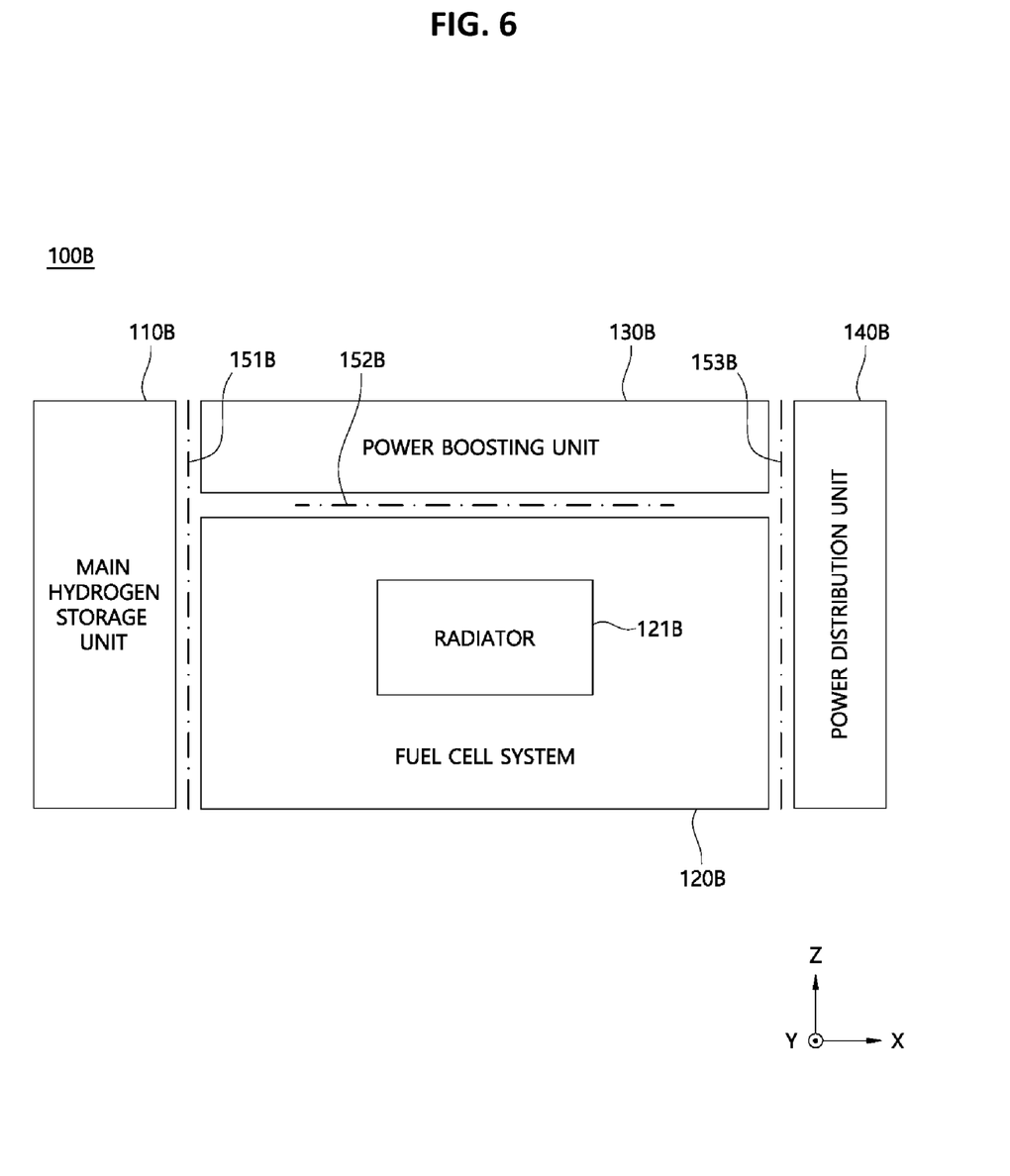
FIG. 6 is an illustrative schematic view showing the construction of a fuel cell power generation system according to various exemplary embodiments of the present disclosure.

FIG. 6 is an illustrative schematic view showing the internal construction of a case of a fuel cell power generation system according to various exemplary embodiments of the present disclosure. As shown, the fuel cell power generation system 100B according to the various exemplary embodiments has a structure in which a power boosting unit 130B is provided above a fuel cell system 120B, unlike the fuel cell power generation system 100A according to the various exemplary embodiments shown in FIG. 3. In the present structure, however, the power boosting unit 130A must be provided so that maintenance may be performed at the upper portion of the fuel cell system 120B. For example, the power boosting unit 130A is provided so that an ion filter, an air cleaner, and an upper end portion of a junction box forming the fuel cell system 120B may be easily replaced. In the various exemplary embodiments of the present disclosure, a main hydrogen non-transitory storage unit 110B, the power boosting unit 130B, and a power distribution unit 140B perform the same functions as in the various exemplary embodiments of the present disclosure shown in FIG. 3. Even in the present exemplary embodiment of the present disclosure, circuit portions forming the power boosting unit 130B provided above the fuel cell system 120B may be protected from hot air generated by a radiator 121B due to a second partition 152B.

A multi-purpose power use device may be connected to the fuel cell power generation system according to each of the various exemplary embodiments of the present disclosure to use power generated by the fuel cell power generation system. For example, the fuel cell power generation system may be used as an auxiliary power production device of a vehicle using a fuel cell as a driving source, or may be mounted to another application device to be used as a range extender.

Figure 7:
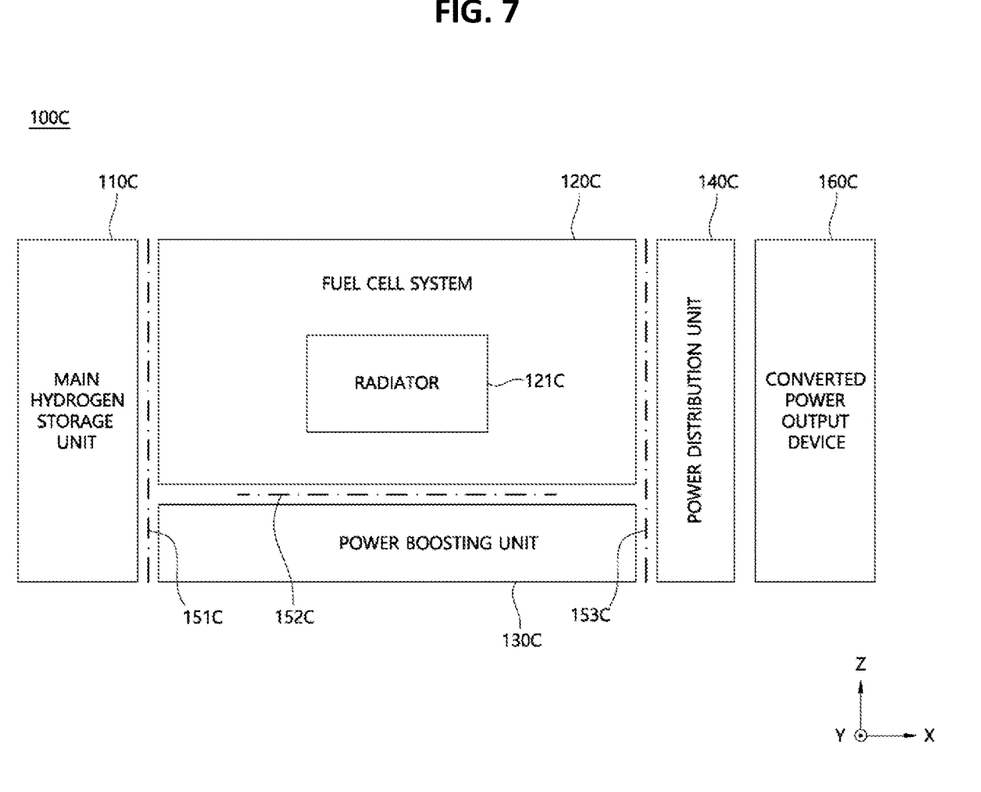
FIG. 7 is an illustrative schematic view showing the construction of a fuel cell power generation system according to various exemplary embodiments of the present disclosure.
Figure 8:
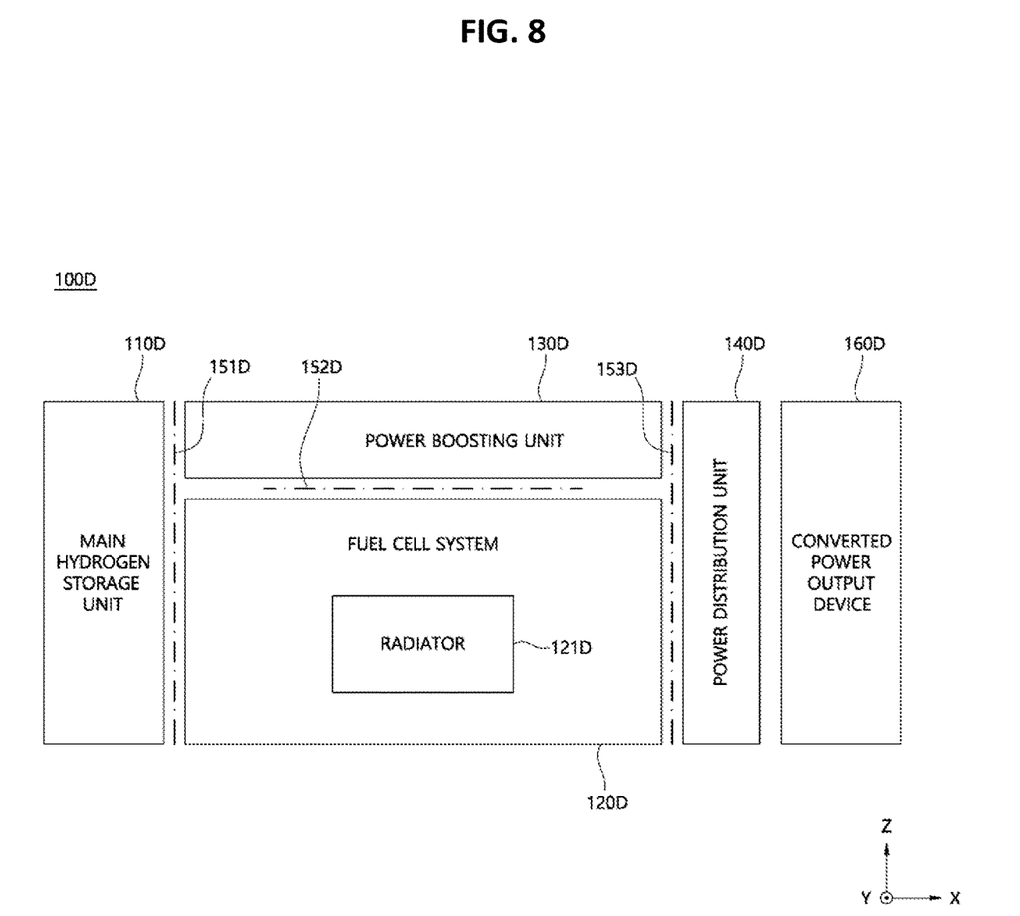
FIG. 8 is an illustrative schematic view showing the construction of a fuel cell power generation system according to various exemplary embodiments of the present disclosure.

FIG. 7 is an illustrative schematic view showing the construction of a fuel cell power generation system 100C according to various exemplary embodiments of the present disclosure, and FIG. 8 is an illustrative schematic view showing the construction of a fuel cell power generation system 100D according to various exemplary embodiments of the present disclosure.

Unlike the fuel cell power generation system 100A according to the various exemplary embodiments shown in FIG. 3 and the fuel cell power generation system 100B according to the various exemplary embodiments shown in FIG. 6, a converted power output device 160C or 160D is connected to a power distribution unit 140C or 140D to use power generated by a fuel cell system 120C or 120D. It is preferable for the converted power output device 160C or 160D to be mounted at the rear of the fuel cell power generation system so that a user can easily access the converted power output device 160C or 160D in the state in which the fuel cell power generation system 100C or the fuel cell power generation system 100D is mounted in the cargo box of the vehicle.

The converted power output device 160C or 160D may include a normal power conversion unit configured to convert normal power into AC power desired by a user using a semiconductor device for power and to control power flow. The converted power output device 160C or 160D may include an electric vehicle charging device configured to charge a battery of an electric vehicle.

Figure 9:
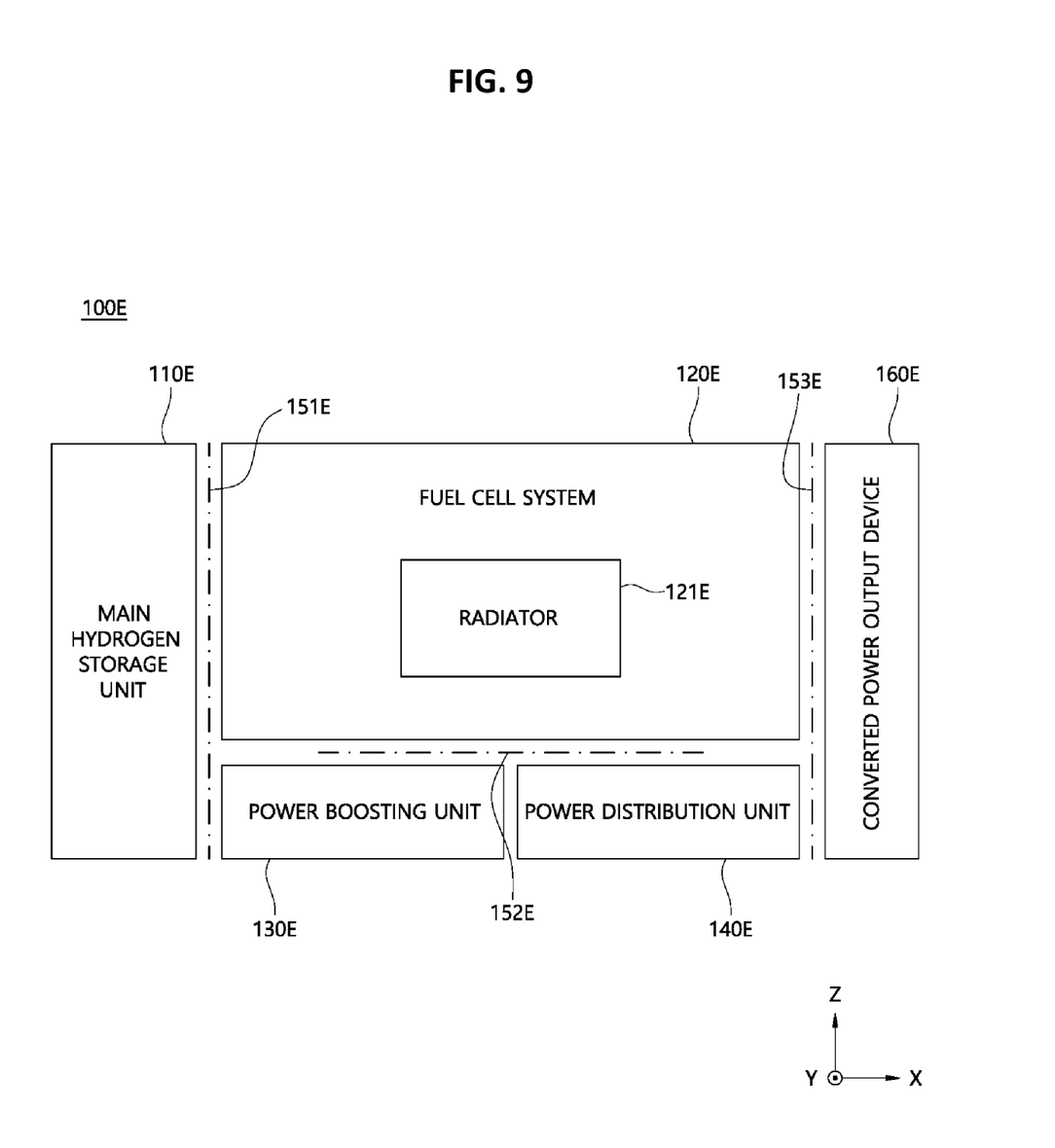
FIG. 9 is an illustrative schematic view showing the construction of a fuel cell power generation system according to various exemplary embodiments of the present disclosure.
Figure 10:
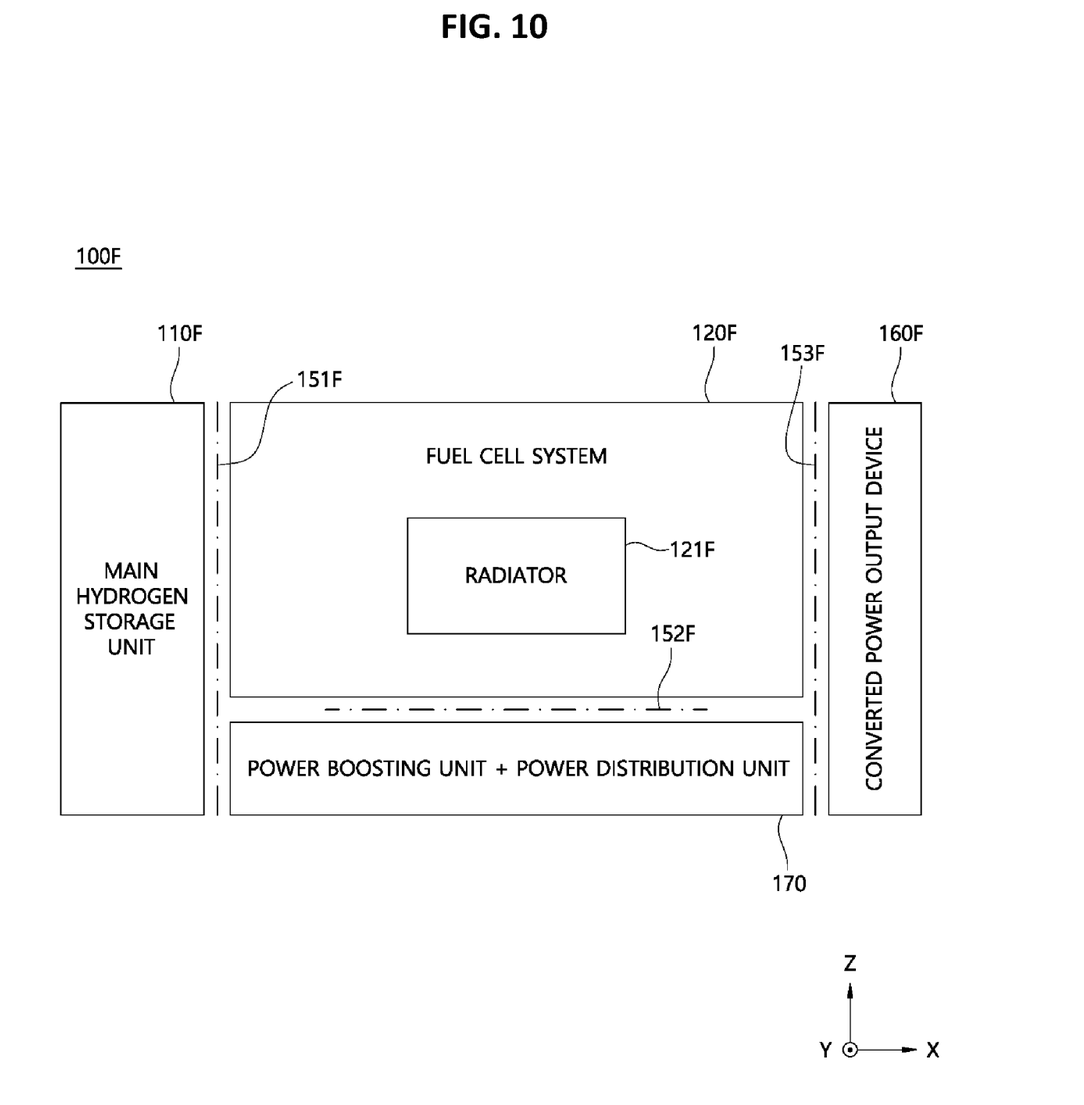
FIG. 10 is an illustrative schematic view showing the construction of a fuel cell power generation system according to various exemplary embodiments of the present disclosure.

FIG. 9 is an illustrative schematic view showing the construction of a fuel cell power generation system 100E according to various exemplary embodiments of the present disclosure, and FIG. 10 is an illustrative schematic view showing the construction of a fuel cell power generation system 100F according to various exemplary embodiments of the present disclosure.

As shown in FIG. 9, a power boosting unit 130E and a power distribution unit 140E may be provided in the same plane under a fuel cell system 120E. Unlike the various exemplary embodiments of FIG. 7 and the various exemplary embodiments of FIG. 8, a third partition unit 153E or 153F means a partition provided between a fuel cell system 120E or 120F and a converted power output device 160E or 160F. Although not separately shown, the power boosting unit 130E and the power distribution unit 140E may be provided in the same plane above the fuel cell system 120E. Furthermore, although not separately shown, a separate partition may be provided between the power boosting unit 130E and the power distribution unit 140E.

Meanwhile, as shown in FIG. 10, an integrated unit 170 including a power boosting unit and a power distribution unit may be provided under the fuel cell system 120F. Furthermore, although not separately shown, the integrated unit may be provided above the fuel cell system 120F. The integrated unit may perform the same functions as the power boosting unit and the power distribution unit.

Figure 11:
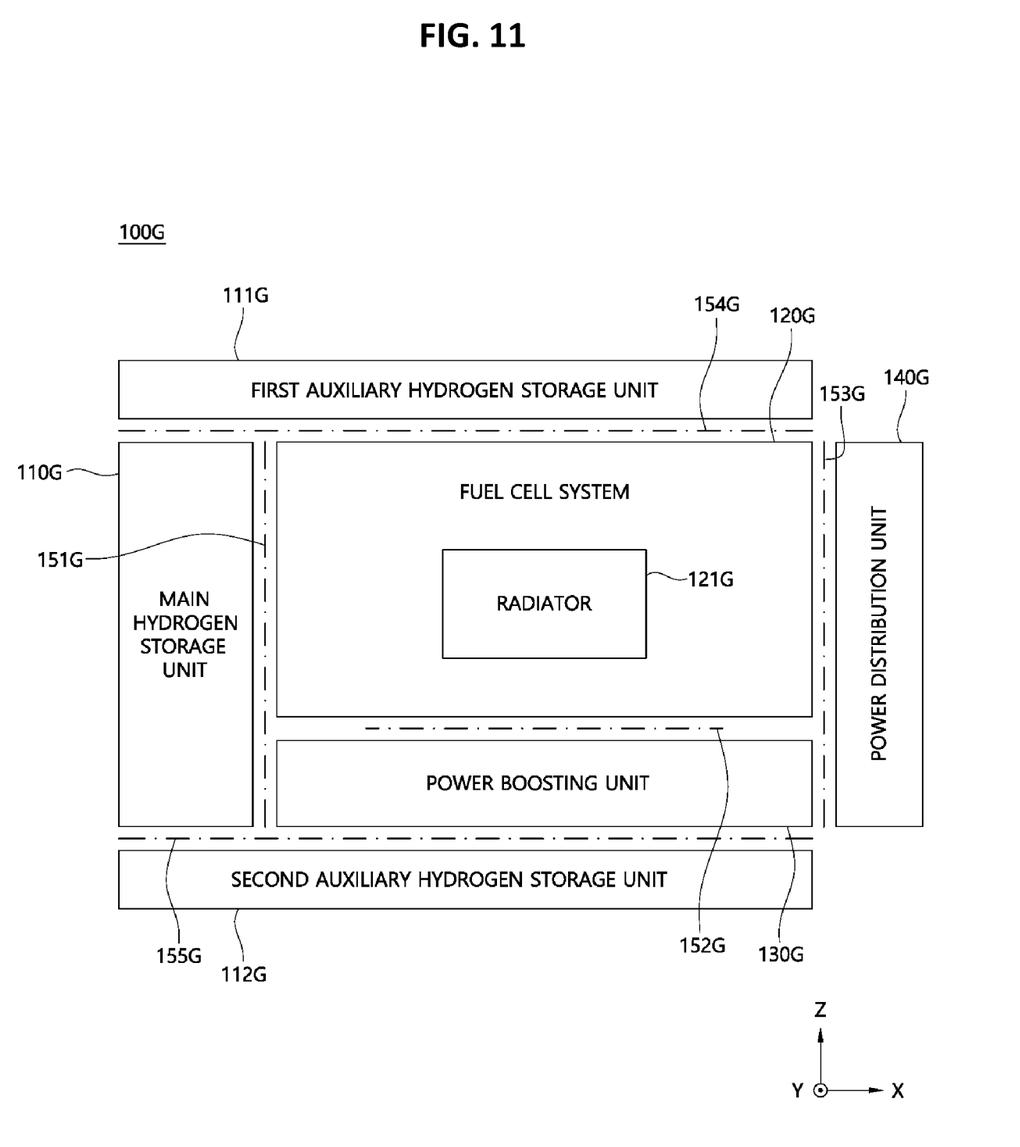
FIG. 11 is an illustrative schematic view showing the construction of a fuel cell power generation system according to various exemplary embodiments of the present disclosure.

FIG. 11 is an illustrative schematic view showing the construction of a fuel cell power generation system according to various exemplary embodiments of the present disclosure. The fuel cell power generation system 100G according to the various exemplary embodiments are provided for the case in which the amount of power required by an application device is increased. First and second auxiliary hydrogen storage units 111G and 112G are further provided at the fuel cell power generation system 100A according to the various exemplary embodiments shown in FIG. 3. Although the auxiliary hydrogen storage units are shown as being added to the various exemplary embodiments shown in FIG. 3, the auxiliary hydrogen storage units may be equally applied to the fuel cell power generation system according to each of the second and various exemplary embodiments of the present disclosure.

Any one of the first and second auxiliary hydrogen storage units 111G and 112G may be optionally provided, or both the first and second auxiliary hydrogen storage units 111G and 112G may be provided depending on the amount of power that is desired. When the auxiliary hydrogen storage units are additionally provided, it is preferable for the auxiliary hydrogen storage units to be provided in consideration of the overall height of the fuel cell power generation system.

Meanwhile, a fourth partition 154G and/or a fifth partition 155G may be further provided to prevent air supplied from a radiator 121G and heated by a fuel cell system 120G from being directly transferred to the first and second auxiliary hydrogen storage units 111G and 112G.

Although not shown, an auxiliary hydrogen storage unit may be further provided at the fuel cell power generation system according to each of the second to various exemplary embodiments of the present disclosure. Also, in the above description of the embodiments, the main hydrogen storage units are denoted by 110A, 110B, 110C, 110D, 110E, 110F, and 110G, which are provided to distinguish between the embodiments, although the main hydrogen storage units perform the same function. In the same manner, 120A, 120B, 120C, 120D, 120E, 120F, and 120G indicate the fuel cell systems that perform the same function, 130A, 130B, 130C, 130D, 130E, 130F, and 130G indicate the power boosting units that perform the same function, and 140A, 140B, 140C, 140D, 140E, 140F, and 140G indicate the power distribution units that perform the same function. Also, in the respective embodiments, the partition units, although being denoted by different reference symbols, perform the same function.

As described above, when a discharged electric vehicle is far away from an electric charging station, the fuel cell power generation system according to an exemplary embodiment of the present disclosure may be moved to the discharged electric vehicle in a state of being mounted in a cargo box of a vehicle to charge the discharged electric vehicle. Furthermore, when the fuel cell system is removed from the cargo box to be used as a stationary system, a desired converted power output device may be configured to use power for various purposes, and hot air from the radiator may be prevented from being transferred to devices therearound. Furthermore, the fuel cell power generation system may be mounted to another application device configured for power enlargement.

As is apparent from the above description, a fuel cell power generation system according to an exemplary embodiment of the present disclosure has effects in that, when a discharged electric vehicle is far away from an electric charging station, the fuel cell power generation system is moved to the discharged electric vehicle in a state of being mounted in a cargo box of a vehicle to charge the discharged electric vehicle, in that, when a fuel cell system is used as a stationary system, hot air from a radiator is prevented from being transferred to devices therearound, and in that the fuel cell power generation system is mounted to another application device for power enlargement.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A fuel cell power generation system comprising:
   a fuel cell system;
   a radiator configured to cool the fuel cell system;
   a main hydrogen storage unit provided at one side of the fuel cell system, the main hydrogen storage unit being configured to store hydrogen supplied to the fuel cell system;
   a power boosting unit provided to overlap the fuel cell system in a vertical direction of fuel cell power generation system, the power boosting unit being configured to boost power generated by the fuel cell system;
   a power distribution unit configured to distribute power boosted by the power boosting unit; and
   a partition unit configured to prevent heat discharged from the radiator from being transferred to the main hydrogen storage unit, the power boosting unit, and the power distribution unit.

2. The fuel cell power generation system of claim 1, wherein the power boosting unit is provided at a lower end portion of the fuel cell system.

3. The fuel cell power generation system of claim 1, wherein the power boosting unit is provided at an upper end portion of the fuel cell system.

4. The fuel cell power generation system of claim 2, wherein the power distribution unit is provided in an identical plane to the power boosting unit.

5. The fuel cell power generation system of claim 4, wherein the power distribution unit and the power boosting unit are integrated.

6. The fuel cell power generation system of claim 1, further including a converted power output device connected to the power distribution unit, the converted power output device being configured to use power generated by the fuel cell system.

7. The fuel cell power generation system of claim 6, wherein the converted power output device includes at least one of an electric vehicle charging device and a normal power conversion unit.

8. The fuel cell power generation system of claim 1, wherein the fuel cell system includes a power module complete (PMC).

9. The fuel cell power generation system of claim 1, wherein the radiator is provided at each of opposite side surfaces of the fuel cell system.

10. The fuel cell power generation system of claim 1, wherein the power boosting unit includes at least one of a fuel cell DC-DC converter (FDC), a bidirectional low DC-DC converter (BLDC), and a battery.

11. The fuel cell power generation system of claim 1, wherein the power distribution unit is a high voltage distributor configured to distribute power generated by the fuel cell system.

12. The fuel cell power generation system of claim 1, wherein the partition unit includes:
    a first partition provided between the fuel cell system and the main hydrogen storage unit;
    a second partition provided between the fuel cell system and the power boosting unit; and
    a third partition provided between the fuel cell system and the power distribution unit.

13. The fuel cell power generation system of claim 12, wherein the second partition is spaced from the first partition and the third partition.

14. The fuel cell power generation system of claim 1, further including an auxiliary hydrogen storage unit configured to additionally supply hydrogen to the fuel cell system.

15. The fuel cell power generation system of claim 14, further including an additional partition provided between the fuel cell system and the auxiliary hydrogen storage unit.

16. The fuel cell power generation system of claim 1, further including a case configured to prevent introduction of foreign matter into the fuel cell power generation system and to protect the fuel cell system, the main hydrogen storage unit, the power boosting unit, and the power distribution unit from external impact.

17. The fuel cell power generation system of claim 16, wherein the case includes:
    an upper end maintenance window provided at an upper end portion of the case to maintain the fuel cell system;
    a side maintenance window provided at a side surface of the case to maintain the main hydrogen storage unit;
    a middle maintenance window provided at a middle portion of the case to maintain the power boosting unit; and
    a rear door configured to allow use of the converted power output device.

18. The fuel cell power generation system of claim 17, wherein each of the upper end maintenance window, the side maintenance window, and a side surface of the case has a mesh structure configured to perform air cooling.

19. The fuel cell power generation system of claim 17, wherein at least one of the upper end maintenance window, the side maintenance window, and the middle maintenance window is removable.

20. The fuel cell power generation system of claim 17, wherein the upper end maintenance window has a structure configured to discharge rainwater introduced into the case on a rainy day to outside of the case.

21. The fuel cell power generation system of claim 20, wherein the upper end maintenance window has a mesh structure configured to exhaust air to the outside of the fuel cell power generation system therethrough.

\* \* \* \* \*